Figure 1:
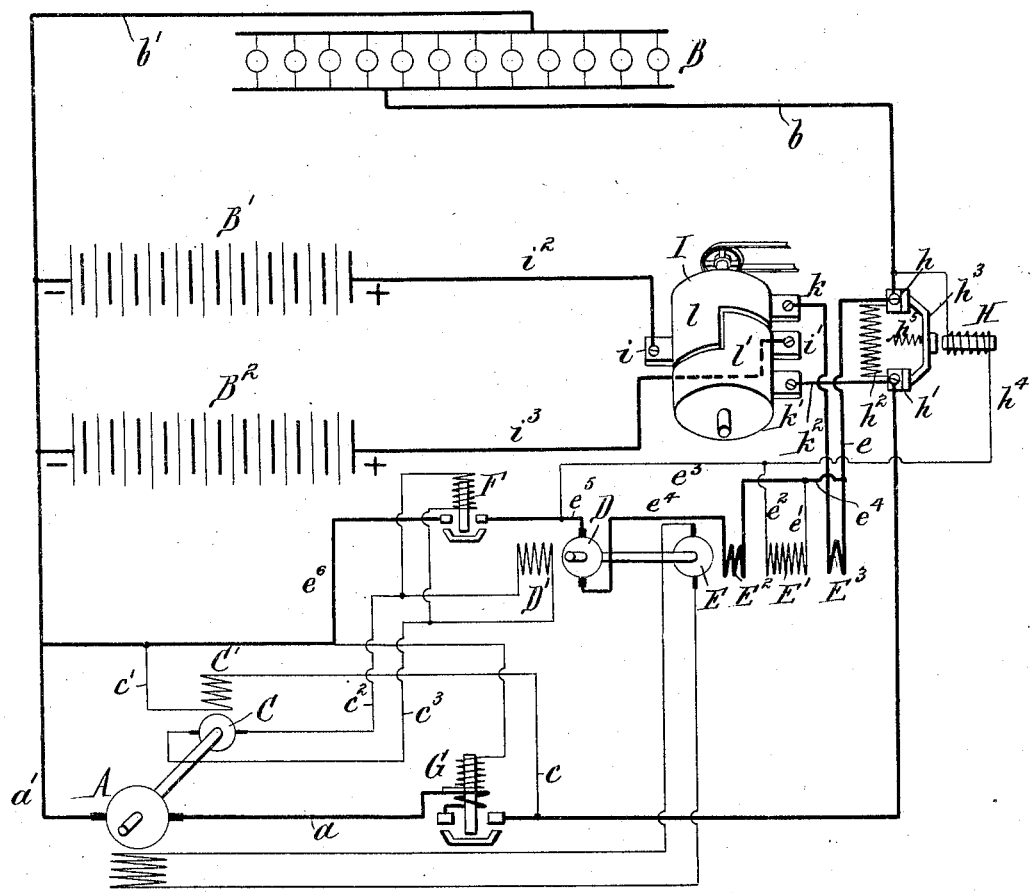

No. 849,644. PATENTED APR. 9, 1907.
W. A. TURBAYNE.
SELF-REGULATING SYSTEM OF ELECTRICAL DISTRIBUTION.
APPLICATION FILED APR. 28, 1905.

Witnesses:—

Inventor
Wm. A. Turbayne,
by Wilhelm, Parker & Hard
Attorneys.

UNITED STATES PATENT OFFICE.

WILLIAM A. TURBAYNE, OF LANCASTER, NEW YORK, ASSIGNOR TO GOULD COUPLER COMPANY, OF NEW YORK, N. Y.

SELF-REGULATING SYSTEM OF ELECTRICAL DISTRIBUTION.

No. 849,644.　　　　Specification of Letters Patent.　　　Patented April 9, 1907.

Application filed April 28, 1905. Serial No. 257,840.

*To all whom it may concern:*

Be it known that I, WILLIAM A. TURBAYNE, a citizen of the United States, residing at Lancaster, in the county of Erie and State of New York, have invented a new and useful Improvement in Self-Regulating Systems of Electrical Distribution, of which the following is a specification.

This invention relates to self-regulating systems of electrical distribution of the kind disclosed in W. A. Turbayne's patents, Nos. 757,695, April 19, 1904, and 787,012, April 11, 1905, and application for patent filed September 15, 1904, Serial No. 224,505. These systems operate automatically to cause the generator to furnish a practically constant normal current always in the same direction, notwithstanding wide variations of speed of the generator-armature and reversals in the direction of rotation thereof, and the systems are especially applicable to railway-car lighting purposes, where the generator is driven from one of the car-axles. The systems are not, however, restricted to such use. In the system disclosed in said application the field-magnet of the main generator or dynamo is excited by an exciter-dynamo, which is driven with a speed variable in an inverse sense to changes of speed of the main generator by a motor whose field-magnet is energized from an auxiliary dynamo, the armature of which is subject to the same changes in speed and direction of rotation as the armature of the main generator. A storage battery is employed which is charged by the main generator and supplies current to the work-circuit when the car is not in motion or is running so slowly that the main generator does not produce the desired voltage, and the field-magnets of the auxiliary and exciter dynamos and the armature of the motor are excited by windings so related and adjusted, as fully explained in said application and patents, that the normal output of the generator is not only kept practically constant over a very wide range of speed variations but is automatically regulated in accordance with the needs of the battery to prevent waste of energy and evaporation of the electrolyte and is also increased or decreased as load is added to or removed from the work-circuit.

The object of this invention is to equip such a self-regulating system with double batteries and automatic means for periodically switching the batteries so that without defeating the regulating effects of the system first one battery and then the other is connected with and supplies the work-circuit, while the remaining battery is connected with and is charged by the generator, whereby both batteries will be maintained at a practically equalized condition of charge.

While in the above-mentioned application and Patent No. 787,012 provision is made for compensating for rise in battery electromotive force during charge above its discharging value, shown conventionally as an automatic resistance device, in order to maintain a substantially constant electromotive force across the work-circuit, which also supplies the exciter-motor armature, in the present case as the work-circuit is always fed from the discharging battery only the discharging electromotive force of the latter will be impressed across the work-circuit, and therefore no further regulation is required.

Figure 2:
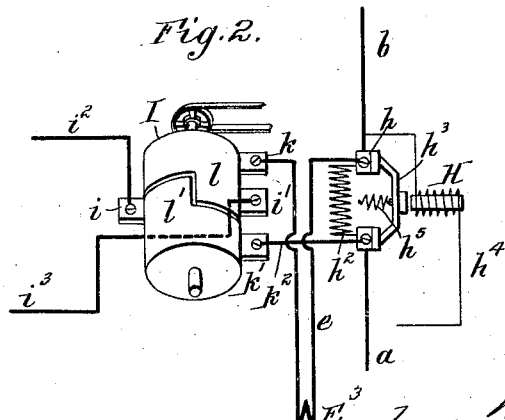

In the accompanying drawings, Figure 1 is a diagrammatic view of a self-regulating system of electrical distribution embodying the invention. Fig. 2 is a fragmentary diagrammatic view showing a different position of the battery-changing switch.

Like letters of reference refer to like parts in both figures.

A represents the main generator, the armature of which is driven at varying speeds and may at times be driven in opposite directions; B, the incandescent lamps or other translating devices connected across the work-circuit $b\ b'$, and B' B$^2$ the storage batteries connected across the generator-circuit $a\ a'$ and work-circuit $b\ b'$, as hereinafter explained.

C represents the auxiliary dynamo, whose armature is subject to the same variations in speed and direction of rotation as of the main generator and which may for this purpose be secured to the shaft upon which the armature of the main generator is mounted. The field-windings C' of this auxiliary dynamo C are preferably fed directly from the battery, as by conductors $c\ c'$, and are subject to the variations of voltage of the battery as determined by its condition of charge, or they may be fed from a constant source.

D represents the motor, and E the exciter-dynamo, whose armature is driven by the motor and which excites the field-magnet of the main generator. The field-windings D' of the motor D are connected across the brushes of the auxiliary dynamo C by conductors $c^2$ $c^3$ and are energized by the current produced by said auxiliary dynamo.

The field-magnet of the exciter-dynamo E preferably has three windings—a fine-wire winding E', which is connected in shunt across the work-circuit, as by conductors $e$ $e^4$ $e'$ $e^2$ $e^3$ $e^5$ $e^6$, a second coarse-wire winding $E^2$, which is connected in series with the armature of the motor D across the work-circuit, as by conductors $e$ $e^4$ $e^5$ $e^6$, and a third coarse-wire winding $E^3$, connected in series with the work-circuit by the conductor $e$.

F represents the automatic switch for connecting the armature of the motor and the field-winding $E^2$ of the exciter-dynamo, which is connected with the motor-armature and also the field-winding E' in circuit when the main generator attains a predetermined speed, and G the automatic switch for similarly connecting the main generator into the battery and work-circuit when a predetermined electromotive force across the main generator is produced.

The parts above briefly described bear the same relation as the corresponding parts in said application and Letters Patent and operate, as fully described therein, to vary the field excitation of the main generator in an inverse sense to and in a greater ratio than the changes in speed of the generator, thereby maintaining the output of the main generator practically constant throughout a wide range of speed variation in the main generator. The output of the main generator will also be regulated in accordance with the needs of the battery and according to the needs of the work-circuit as determined by the amount of work which the latter has to perform.

The connections of the batteries with the generator and work circuits are arranged as follows: The conductors $a$ and $b$ of the generator and work circuits are interrupted and terminate in contact-pieces $h$ $h'$, which are connected by a resistance material $h^2$. While the resistance is not necessary to the operation of the system, it is sometimes desirable, as when provided the generator will furnish a portion of the current supplying the translating devices, thereby relieving the discharging battery an amount depending on the amount of inserted resistance. An electromagnetic resistance cut-out H has a movable armature $h^3$, which when closed, as shown in the drawings, bridges the contacts $h$ $h'$ and affords a direct path for the current between the contacts $h$ $h'$ and when open forces any generator-current to the work-circuit to pass from one contact to the other through the resistance $h^2$. The magnet-coil of this switch is connected in shunt across the work-circuit, as by a conductor $h^4$, connecting the conductors $b$ and $e^5$, and when the motor-switch F is closed, which happens when the generator attains a predetermined speed, the magnet of the resistance cut-out is energized and moves its armature to open position, thus cutting in the resistance $h^2$. The armature $h^3$ is held in closed position against the contacts $h$ $h'$ by a spring $h^5$ or other means. Any other automatic means for cutting in the resistance $h^2$ when the generator reaches a desired speed and cutting out the resistance when the generator falls below this speed can be employed.

I represents a battery-changing switch, which preferably comprises stationary contacts $i$ $i'$, connected to the batteries B' $B^2$, respectively, by conductors $i^2$ $i^3$, stationary contacts $k$ $k'$, connected to the cut-out contacts $h$ $h'$ by conductors $e$ and $k^2$, and a rotating contact-drum, which is divided transversely into two insulated sections $l$ $l'$ and which is rotated slowly while the generator is in action by suitable means. During one half-revolution of the drum part $l$ thereof connects the contact $i$ of the battery B' with the cut-out contact $k$, so that this battery supplies the work-circuit through the conductor $i^2$, contact $i$, drum-section $l$, contact $k$, and conductor $e$, while the other drum-section $l'$ connects the contact $i'$ of the battery $B^2$ with the cut-out contact $k'$, so that this battery is charged by current from the generator passing through conductors $a$ $k^2$, contact $k'$, drum-section $l'$, contact $i'$, and conductor $i^3$. During the other half-revolution the drum, as shown in Fig. 2, reverses the connections, so that the contact $i$ of the battery B' is connected by the drum part $l'$ with the cut-out contact $k'$, and the battery B' is placed on charge, while the contact $i'$ of the other battery $B^2$ is connected by drum part $l$ with cut-out contact $k$, and this battery is connected with and supplies the work-circuit. Other switching means for changing the connections of the batteries, as described, could be used in place of those above described.

The series winding $E^3$ of the exciter-dynamo is contained in the conductor $e$, which connects the discharging battery with the work-circuit, and when the lamps are lighted or the work-circuit is performing work the current passes through the winding $E^3$ in such direction that it acts cumulatively with the other windings E' $E^2$ of the exciter-dynamo, as explained in my said application, thereby regulating the excitation and output of the exciter-dynamo, and consequently the output of the main generator in accordance with the load on the work-circuit. The action of this series winding $E^3$ is the same irrespective of which battery is discharging. When the lamps are off or the work-circuit is idle, some current from the main generator will pass to the batteries in parallel through the conductor $k^2$ and the resistance $h^2$ and conductor $e$, thus traversing the conductor $e$ and winding $E^3$ in the opposite direction, so that the winding $E^3$ then acts differentially and further decreases the field excitation of the exciter-dynamo, and consequently the excitation and output of the main generator.

When the main generator has stopped or is running too slowly to produce a predetermined electromotive force, for which the system is adjusted, then the motor-switch F will open and demagnetize the magnet of the resistance cut-out switch H, the armature of which will be moved by its spring to connect the contacts $h$ $h'$ and cut out the resistance $h^2$. The two batteries are then both connected to the work-circuit and will jointly supply the same, sharing the load in proportion to their capacities as represented by their condition of charge. At the moment that the resistance cut-out switch H closes the battery, which was up to this instant being charged by the generator, will by virtue of its higher electromotive force furnish a greater portion of the current than the battery which had been supplying the work-circuit, and the former will continue to furnish the larger share until the two batteries become equalized as to capacity, when the load will be equally divided between the two sets.

While the exciter-dynamo is preferably provided with the two windings $E'$ and $E^2$ in addition to the series winding $E^3$, to enable the more perfect regulation of the system the system will produce desirable results if the winding $E^2$, which is connected in series with the motor-armature, is omitted, providing, as explained in Patent No. 787,012, the characteristics of the apparatus are such that regulation will be effective without the additional winding.

I claim as my invention—

1. The combination of a main generator, a work-circuit, storage batteries, an exciter apparatus for the main generator whose electromotive force varies in an inverse sense to changes in speed of the main generator, and automatic means constructed to periodically connect said batteries alternately with the work-circuit to supply the latter and with the main generator to be charged, substantially as set forth.

2. The combination of a main generator, a work-circuit, storage batteries, an exciter apparatus for the main generator whose electromotive force varies in an inverse sense to changes in speed of the main generator, and in a direct sense to changes in load on the work-circuit, and means for connecting said batteries alternately with the work-circuit to supply the latter and with the main generator to be charged, substantially as set forth.

3. The combination of a main generator, a work-circuit, storage batteries, an exciter apparatus for the main generator having a winding influenced by current changes in the work-circuit for varying the electromotive force of the exciter apparatus in a direct sense to changes in load on the work-circuit, and means for connecting said batteries alternately with said exciter-winding and the work-circuit and then with the main generator, substantially as set forth.

4. The combination of a main generator, a work-circuit, storage batteries, an exciter apparatus for the main generator whose electromotive force varies in an inverse sense to changes in speed of the main generator, and which has a winding connected with the work-circuit for varying the electromotive force of the exciter apparatus in a direct sense to changes in load on the work-circuit, and means for connecting said batteries alternately with the work-circuit and said exciter-winding and then with the main generator, substantially as set forth.

5. The combination of a main generator, a work-circuit, storage batteries, an exciter apparatus for the main generator having a winding in series with the work-circuit for varying the electromotive force of the exciter apparatus in a direct sense to changes in load on the work-circuit, and means for connecting said batteries alternately with said exciter-winding and the work-circuit and then with the main generator, substantially as set forth.

6. The combination of a main generator, a work-circuit, a storage battery connected with the work-circuit, a second storage battery connected with the main generator, means for changing the battery connections so that the battery in connection with the main generator is placed in connection with the work-circuit and vice versa, and an exciter apparatus for the main generator having a winding for regulating the voltage of the exciter apparatus, said winding being supplied by the battery which is in connection with the work-circuit, substantially as set forth.

7. The combination of a main generator, a work-circuit, a storage battery connected with the work-circuit, a second storage battery connected with the main generator, automatic means for periodically changing the battery connections so that the battery in connection with the main generator is placed in connection with the work-circuit and vice versa, and an exciter apparatus for the main generator having a winding for varying the voltage of the exciter apparatus in correspondence with changes in load on the work-circuit, said winding being supplied by the battery which is in connection with the work-circuit, substantially as set forth.

8. The combination of a main generator, a work-circuit, a storage battery connected with the work-circuit, a second storage battery connected with the main generator, a resistance between the connections of the batteries with the work-circuit and the main generator, means for changing the battery connections so that the battery in connection with the main generator is placed in connection with the work-circuit and vice versa, an exciter apparatus for the main generator having a winding for regulating the voltage of the exciter apparatus, said winding being supplied by the battery which is in connection with the work-circuit, and means for short-circuiting said resistance when the main generator is out of action or is not furnishing a desired output, substantially as set forth.

Witness my hand this 20th day of April, 1905.

WILLIAM A. TURBAYNE.

Witnesses:
EDWARD C. HARD,
C. W. PARKER.